(12) United States Patent
Rogers (10) Patent No.: US 7,508,813 B2
(45) Date of Patent: Mar. 24, 2009

(54) LOCAL AREA NETWORK CONTENTION AVOIDANCE

(75) Inventor: Steven A Rogers, Portsmouth, NH (US)

(73) Assignee: Rivulet Communications, Portsmouth, NH (US)

( * ) Notice: Subject to any disclaimer, the term of this patent is extended or adjusted under 35 U.S.C. 154(b) by 0 days.

(21) Appl. No.: 10/722,676

(22) Filed: Nov. 25, 2003

(65) Prior Publication Data

US 2005/0111357 A1  May 26, 2005

(51) Int. Cl.
*H04L 12/28* (2006.01)
*H04L 12/56* (2006.01)

(52) U.S. Cl. .............. 370/352; 370/389; 370/395.4; 709/235

(58) Field of Classification Search ......... 370/229–236, 370/389, 392, 401, 395.4, 352; 709/235, 709/224
See application file for complete search history.

(56) References Cited

U.S. PATENT DOCUMENTS

| | | | |
|---|---|---|---|
| 4,745,593 A | 5/1988 | Stewart | |
| 4,821,259 A | 4/1989 | DeBruler et al. | |
| 5,271,000 A | 12/1993 | Engbersen et al. | |
| 5,373,504 A | 12/1994 | Tanaka et al. | |
| 5,408,465 A | 4/1995 | Gusella et al. | |
| 5,432,775 A | 7/1995 | Crayford | |
| 5,455,865 A | 10/1995 | Perlman | |
| 5,477,531 A | 12/1995 | McKee et al. | |
| 5,517,620 A | 5/1996 | Hashimoto et al. | |
| 5,541,921 A | 7/1996 | Swenson et al. | |
| 5,563,875 A | 10/1996 | Hefel et al. | |
| 5,610,903 A | 3/1997 | Crayford | |
| 5,734,656 A | 3/1998 | Prince et al. | |
| 5,774,668 A | 6/1998 | Choquier et al. | |
| 5,781,534 A | 7/1998 | Perlman et al. | |
| 5,859,835 A | 1/1999 | Varma et al. | |
| 5,859,979 A | 1/1999 | Tung et al. | |
| 5,917,822 A | 6/1999 | Lyles et al. | |

(Continued)

FOREIGN PATENT DOCUMENTS

EP 0827307 A2 3/1998

(Continued)

OTHER PUBLICATIONS

IEEE Communications Magazine Oct. 2003; Topics in Internet Technology; "Packet Sequencing a Deterministic Protocol for Qos in IP Networks"; Sean S. B. Moore and Curtis A. Siller, Jr., Cetacean Networks, Inc; Abstract pp. 98-107.

(Continued)

*Primary Examiner*—Wing F Chan
*Assistant Examiner*—Robert C Scheibel
(74) *Attorney, Agent, or Firm*—Banner & Witcoff, Ltd.

(57) ABSTRACT

The invention provides a method for transmitting packets in a network from multiple data sources, by eliminating contention among local transmitters in the network. A device comprises a CPU and other modules that accept input from various signal sources. The device processes the signals from the various sources, converts the signals to data and then outputs the signal data in the form of packets which it sends via a LAN and/or WAN, thus avoiding contention on the LAN. The invention may initiate and receive connections via the LAN or WAN and begin transmitting over the LAN or WAN at agreed-upon rates without contention.

30 Claims, 7 Drawing Sheets

U.S. PATENT DOCUMENTS

| | | | |
|---|---|---|---|
| 5,974,056 A * | 10/1999 | Wilson et al. | 370/509 |
| 6,047,054 A | 4/2000 | Bayless et al. | |
| 6,058,117 A | 5/2000 | Ennamorato et al. | |
| 6,067,572 A | 5/2000 | Jensen et al. | |
| 6,088,361 A | 7/2000 | Hughes et al. | |
| 6,134,589 A | 10/2000 | Hultgren | |
| 6,141,355 A * | 10/2000 | Palmer et al. | 370/465 |
| 6,208,666 B1 | 3/2001 | Lawrence et al. | |
| 6,240,084 B1 * | 5/2001 | Oran et al. | 370/352 |
| 6,247,061 B1 | 6/2001 | Douceur et al. | |
| 6,272,131 B1 * | 8/2001 | Ofek | 370/389 |
| 6,359,885 B1 | 3/2002 | Kim et al. | |
| 6,373,822 B1 | 4/2002 | Raj et al. | |
| 6,377,579 B1 | 4/2002 | Ofek | |
| 6,385,198 B1 | 5/2002 | Ofek et al. | |
| 6,426,814 B1 | 7/2002 | Berger et al. | |
| 6,426,944 B1 | 7/2002 | Moore | |
| 6,487,593 B2 | 11/2002 | Banks | |
| 6,496,477 B1 | 12/2002 | Perkins et al. | |
| 6,502,135 B1 | 12/2002 | Munger et al. | |
| 6,529,480 B1 | 3/2003 | Stewart et al. | |
| 6,556,564 B2 | 4/2003 | Rogers | |
| 6,560,222 B1 | 5/2003 | Pounds et al. | |
| 6,574,193 B1 | 6/2003 | Kinrot | |
| 6,611,519 B1 * | 8/2003 | Howe | 370/386 |
| 6,618,360 B1 | 9/2003 | Scoville et al. | |
| 6,618,761 B2 | 9/2003 | Munger et al. | |
| 6,628,629 B1 | 9/2003 | Jorgensen | |
| 6,633,544 B1 | 10/2003 | Rexford et al. | |
| 6,711,137 B1 | 3/2004 | Klassen et al. | |
| 6,731,600 B1 | 5/2004 | Patel et al. | |
| 6,778,536 B1 | 8/2004 | Ofek et al. | |
| 2001/0033565 A1 | 10/2001 | Rogers | |
| 2001/0033649 A1 | 10/2001 | Rogers | |
| 2002/0010792 A1 | 1/2002 | Border et al. | |
| 2002/0054611 A1 | 5/2002 | Seta | |
| 2002/0080719 A1 | 6/2002 | Parkvall et al. | |
| 2002/0086641 A1 | 7/2002 | Howard | |
| 2002/0110129 A1 | 8/2002 | Matsuoka et al. | |
| 2002/0186660 A1 | 12/2002 | Bahadiroglu | |
| 2002/0191592 A1 | 12/2002 | Rogers et al. | |
| 2003/0058880 A1 | 3/2003 | Sarkinen et al. | |
| 2003/0067903 A1 | 4/2003 | Jorgensen | |
| 2003/0107991 A1 | 6/2003 | Tezuka et al. | |
| 2003/0117959 A1 | 6/2003 | Taranov | |
| 2003/0188188 A1 | 10/2003 | Padmanabhan et al. | |
| 2003/0219029 A1 | 11/2003 | Pickett | |
| 2004/0008655 A1 | 1/2004 | Park et al. | |
| 2004/0014491 A1 | 1/2004 | Weigand | |
| 2004/0024550 A1 | 2/2004 | Doerken et al. | |
| 2004/0160340 A1 * | 8/2004 | Thomson et al. | 340/945 |
| 2004/0179530 A1 | 9/2004 | Verbesselt et al. | |

FOREIGN PATENT DOCUMENTS

| | | |
|---|---|---|
| JP | 04/056322 A | 2/2004 |
| WO | WO 00/28705 | 5/2000 |
| WO | WO 00/28706 | 5/2000 |
| WO | WO 01/47162 A1 | 6/2001 |
| WO | WO 01/50146 A1 | 7/2001 |
| WO | WO 01/59994 A1 | 8/2001 |
| WO | WO 01/60029 A1 | 8/2001 |
| WO | WO 02/41505 A2 | 5/2002 |
| WO | WO 02/100023 A2 | 12/2002 |
| WO | WO 02/100023 A3 | 12/2002 |
| WO | WO 03/084137 A2 | 10/2003 |

OTHER PUBLICATIONS

Distributed Path Reservation Algorithms for Multiplexed all-Optical Interconnection Networks; X, Yuan, R. Melhem and R. Gupta; Abstract; 10pages.

The Desk Area Network;; Mark Hayter and Derek McAuley; May 1991;Abstract pp. 11.

Clark, M; Jeffay, K; Application -level Measurements of Performance on the vBNS Multimedia Computing and Systems, 1999. IEEE International Conference on Jun. 1999, vol. 2, 7-11, pp. 362-366 vol. 2.

Business Communications Review; Sep. 2003; "Circuit-y New Choices for IP Networks" pp. 18-24.

Packet Sequencing: A Layer -2 Wan Switching Technology for Per-Flow Ideal QoS and Secure IP Networking; Steven A. Rogers, Sean S.B. Moore and Curtis A. Siller, Jr.; Abstract pp. 1-6.

Cetacean Networks; www.cetacean.com; "Cost-Effective IP Networks for High Quality Videoconferencing" Nov. 2002; pp. 1-9.

Copyright @ 2003, Cetacean Networks, Inc.; A Deterministic Protocol for QoS in IP Networks: Packet Sequencing; Steven A. Rogers, Sean S.B. Moore, Ph.D. and Curtis A. Siller, Jr. Ph.D.; Abstract pp. 1-18.

Copyright @ 2003; Packet Sequencing: IP Networks; Sean S.B. Moore, Ph.D.; Cetacean Networks, Inc.; pp. 98-107.

Copyright @ 2001; Practical Limits on Network Utilization in Converged IP Networks; Sean S.B. Moore, Ph.D. ; Cetacean Networks, Inc.; pp. 1-2.

Self-Adjusted Network Transmission for Multimedia Data; Mei-Ling Shyu, Shu-Ching Chen, Hongli Luo; Abstract; 6pages.

The Problem of Upstream Traffic Synchronization in Passive Optical Networks; Glen Kramer; Abstract pp. 1-7.

* cited by examiner

LOCAL AREA NETWORK CONTENTION AVOIDANCE

BACKGROUND OF THE INVENTION

The present invention relates generally to a system for reducing packet congestion for multiple devices that need to communicate over a network, such as the Internet. The subject matter of this application is related to my previously-filed U.S. application Ser. No. 10/697,103, now U.S. Pat. No. 7,339,923, entitled "Endpoint Packet Scheduling System," filed on Oct. 31, 2003.

Ethernet and packet-switched Internet Protocol (IP) networks are systems for transmitting data between different points. These systems are known as "contention-based" systems. That is, all transmitters contend for network resources. All transmitters may transmit simultaneously. If they do, then network resources may be oversubscribed. When this happens, data may be delayed or lost, resulting in network impairment.

Figure 1:
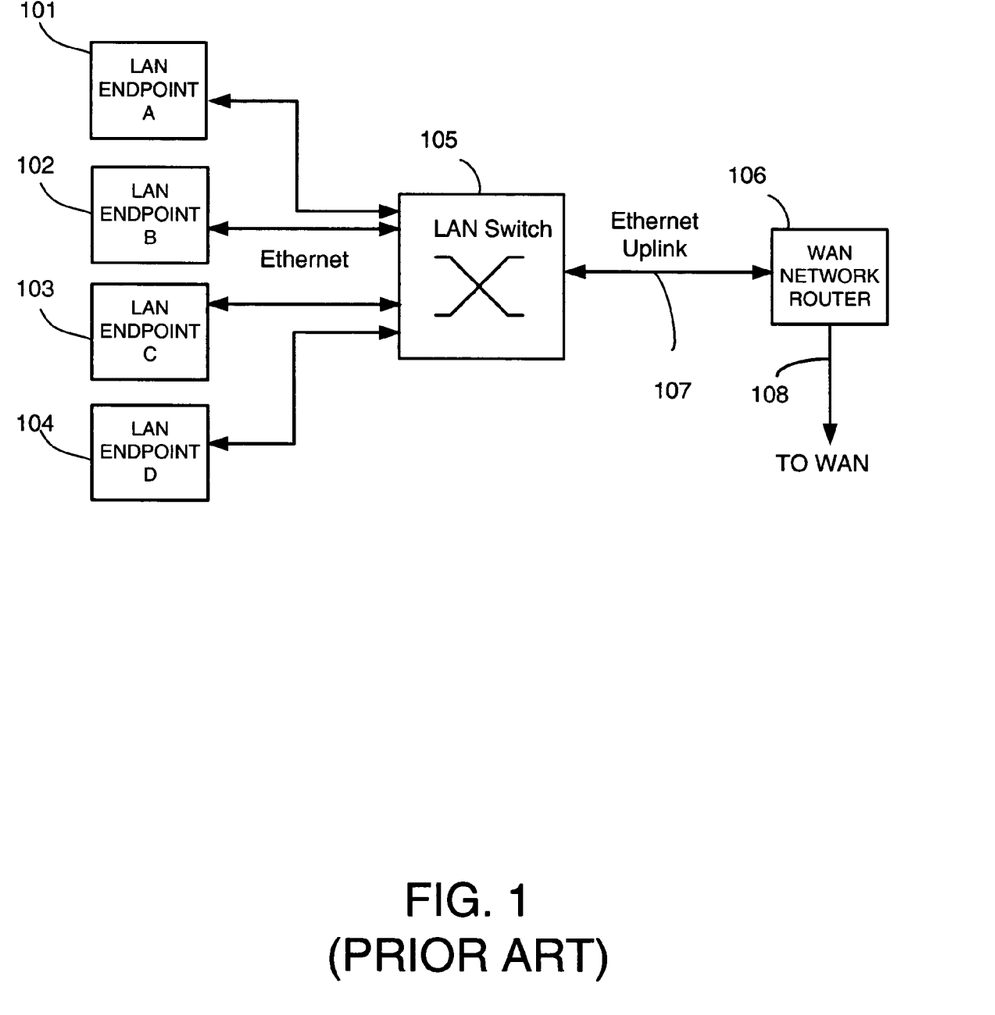
FIG. 1 shows the problem of multiple packet sources creating an overflow condition at a packet switch, leading to packet loss.

As shown in FIG. 1, a conventional network comprises a plurality of Local Area Network (LAN) endpoints, such as computers connected to an Ethernet LAN. The endpoints may comprise, for example, one or more IP-enabled telephones; video cameras; televisions; desktop computers; printers; or any other device that communicates over the LAN. The data may comprise real-time or quasi-realtime data, such as video flames, audio frames (voice-over-IP connections), and other types of data. The endpoints are coupled to one or more LAN switches 105, which connect the LAN to a Wide Area Network (WAN) through a router 106. When multiple endpoint devices transmit packets destined for the WAN, congestion can occur on the uplink 107 and 108.

When endpoint 101 sends packets destined for the WAN, the packets are sent through LAN switch 105, which also handles packets from other LAN endpoints. If too many packets are simultaneously transmitted by the other endpoints to LAN switch 105, LAN switch 105 may have a queue overflow, causing packets to be lost. Similarly, WAN router 106 may have a queue overflow, causing packets to be lost at that point.

The net result is that congestion due to contention among local transmitters causes data to be lost.

The word "packets" will be used to refer to datagrams in a LAN or Wide Area Network (WAN) environment. In a LAN environment, packets are sometimes called "frames." In a packet-switched WAN environment, packet-switching devices are normally referred to as "routers." In some systems, the LAN switching and WAN routing functions can be combined into a single device.

Figure 2:
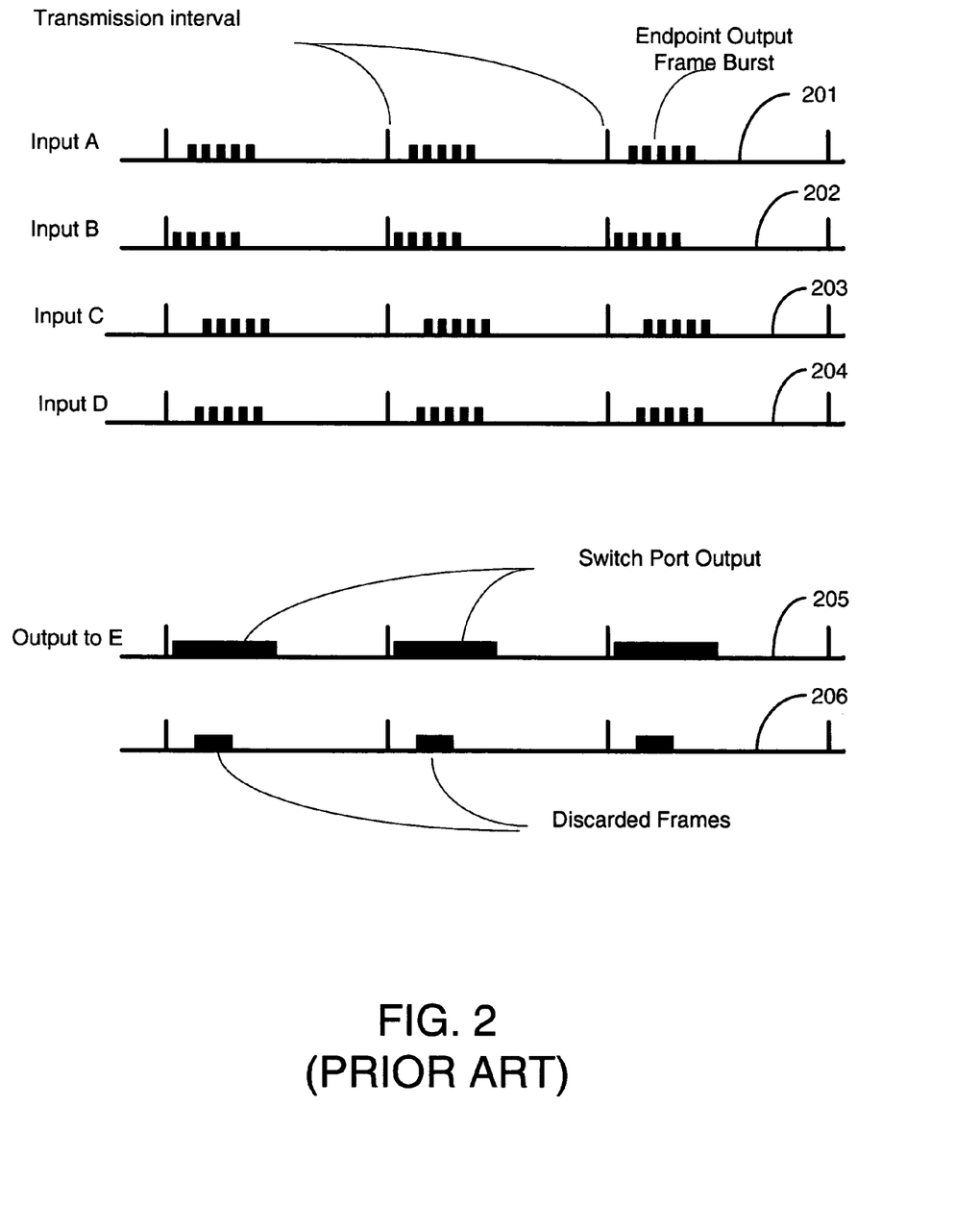
FIG. 2 shows how network congestion can cause packet loss where multiple sets of endpoints share a common network resource under bursty conditions.

FIG. 2 illustrates the nature of the problem of dropped packets, which can occur in a LAN environment as well as a WAN environment. During periods where multiple endpoints are simultaneously transmitting packets on the network, the LAN switch 105 and/or WAN router 106 may become overloaded, such that some packets are discarded. This is typically caused by an internal queue in the devices becoming full and thus becoming unable to accept new packets until the outgoing packets have been removed from the queue. This creates a problem in that transmitting endpoints cannot be guaranteed that their packets will arrive, necessitating other solutions such as the use of guaranteed-delivery protocols such as Transmission Control Protocol (TCP). Such solutions may be inappropriate for broadcast video, voice over IP or other realtime applications, which cannot wait for retransmission of packets.

FIG. 2 depicts the situation where multiple packet flows create congestion and loss within an Ethernet switch. FIG. 2 shows four different flows on four separate Ethernet ports, Input A through Input D (elements 201 through 204), the resulting output flow, Output E (element 205) and the discarded frames 206. Note that Inputs A-D (elements 201 through 204) have bursts of packets that overlap one another time-wise. The utilization of each input 201-204 is within limits. That is, each input is not saturated or oversubscribed. The total utilization of each input 201-204 is also not too much data in aggregate to oversubscribe the Output E (element 205). However, because of the coincidental timing of the packet bursts on Input A through Input D, the Ethernet switch is oversubscribed. Thus packets will be lost when the Ethernet switch queue overflows lost packets, shown as discarded frames 206. Note that frames are not immediately discarded from the combined input frames. The switch uses a queue which is used to hold frames until a later transmission can occur. When concurrent bursts arrive, the queue can fill and cause frames to be discarded as illustrated in element 206.

SUMMARY OF THE INVENTION

The invention provides a method for transmitting packets in a network by eliminating contention among local transmitters in the network. A device comprises a CPU and other components that accept input from various transmitting data sources. The device processes signals from the various transmitting sources and converts these signals to packets, before they are output via a LAN and/or WAN interface, thus avoiding contention on the LAN, since only one device produces the packets from many signal sources. This device may initiate and receive connections via the WAN and begin transmitting over the Ethernet to the WAN at agreed-upon rates, without contention.

DETAILED DESCRIPTION OF THE INVENTION

Figure 3:
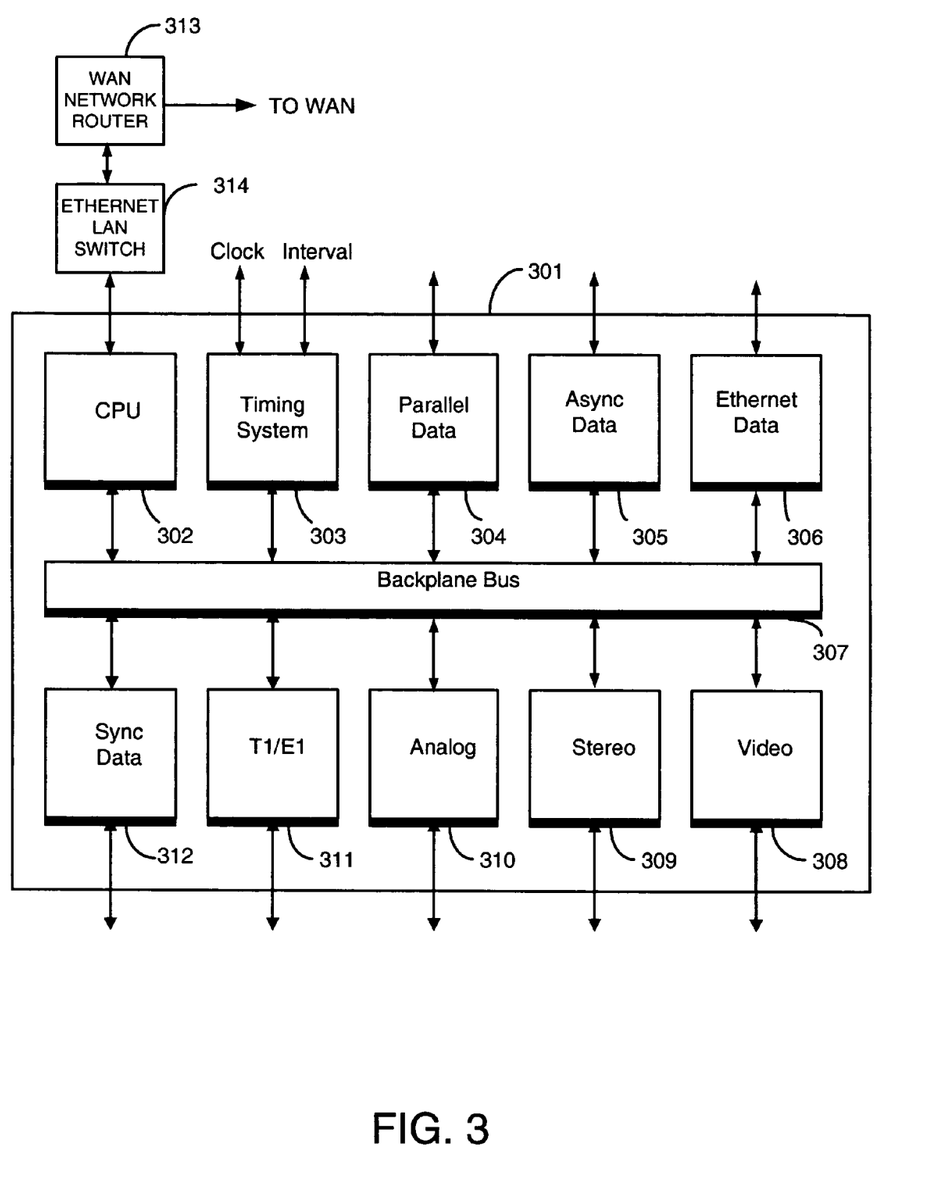
FIG. 3 shows one embodiment of a device for carrying out various principles of the invention.

FIG. 3 shows one possible device for carrying out various principles of the present invention. The device 301 comprises a backplane bus 307 and a CPU 302 that coordinates the scheduling and other activities of the device. CPU 302 may comprise, for example, an IBM 440GX processor. The CPU includes or is coupled to a local area network, such as an Ethernet via an Ethernet interface that outputs Internet Protocol packets encapsulated in Ethernet frames, as is conventional. The Ethernet interface may for example comprise a gigabit Ethernet. Other network interfaces are possible, such as a telecommunication interface, or any type of packet interface. The packet network interface may be coupled to a WAN router 313 for transmission and reception over a Wide Area Network (WAN), such as the Internet. In another embodiment, device 301 may be directly coupled to WAN network router 313 rather than being connected through device 314. In yet another embodiment, device 301 may be directly coupled to the WAN without requiring external devices. In general, device 301 may be coupled through any packet network interface according to the inventive principles.

Device 301 also includes a plurality of modules 303 through 312 that are coupled to a backplane bus 307. The backplane bus may comprise for example a 32-bit wide bus operating at 33 MHz. The modules coupled to the bus may include one or more of the following. A timing system 303 provides clock and interval signals to and from other modules as shown in more detail in FIG. 5. In one embodiment, timing system 303 works as follows. The timing system will receive a reference timing signal from an external source. In many cases this timing source can be a telecom timing reference or a GPS clock. The timing reference enters the timing system 303 as a clock signal. This clock can be a 1 MHz, 5 MHz or 10 MHz signal. It can also be a T1 or E1 clock. The timing system 303 employs a set of clock dividers and phase-locked multipliers to generate the clocks needed by each of the modules 304-312 in the system of FIG. 3 301. Each module can also derive its own timing clock individually by referencing the clock that is provided by the timing system 303 through the backplane 307. The timing system 303 can also be commanded, by the CPU 302, through the backplane 307 to provide timing interrupts at precise intervals, to the CPU 302. These interrupts can be used to initiate transmission of packets at precise intervals to the Ethernet Network. The CPU 302 can also use the precise interrupts, to control its access of data from the various modules 304-312. In this way, the CPU can always have sufficient data from each module to create a packet, at the time the CPU has set to transmit the packet.

A parallel data card 304 accepts parallel data from one or more modules and presents the data to CPU 302 via backplane bus 307. Examples of parallel data include parallel ports on page printers, scientific instruments and memory loading and CPU emulation devices. Asynchronous data card 305 accepts asynchronous data from one or more devices and presents the data to CPU 302 via backplane bus 307. Examples of such data include serial device controllers, communications interfaces to display terminals, keyboards, teletype devices, IR remote control devices, etc. As with the other devices described below, in one embodiment data card 305 can also transmit asynchronous data to one or more devices from the backplane bus 307.

Ethernet data card 306 accepts Ethernet data frames (e.g., ad hoc computer data) and presents the data to CPU 302 via backplane bus 307. Video data card 308 accepts video analog or digital signals from one or more video devices (e.g., video cameras or the like), converts this into digital data, and may compress the digital data before presenting the data to CPU 302 via backplane bus 307. Stereo card 309 accepts stereo analog or digital signals from one or more sources (e.g., CD players, radios, or the like), and may convert the stereo signals to digital data and presents the data to CPU 302 via backplane bus 307. Analog card 310 converts analog data (e.g., voice, measurements, or other analog data) into digital form and presents the data to CPU 302 via backplane bus 307. T1/E1 card 311 receives data in T1/E1 format from one or more sources and presents it to CPU 302 via backplane bus 307. Synchronous data card 312 accepts synchronous data from various sources and presents it to CPU 302 via backplane 307. The various modules shown in FIG. 3 are intended to be illustrative only. More or fewer modules may be included, and other types of data beyond those illustrated may be included.

In one embodiment, CPU 302 organizes the work that is done by the modules connected to backplane bus 307. CPU 302 detects the presence of data at one or more of the modules; retrieves the data in a format suitable for the particular module; reformats the data into Ethernet packet frames; and transmits each packet via Ethernet to an Ethernet LAN switch 314 to a WAN network router 313, or via Ethernet directly to a WAN network router 313. The data can be transmitted over the bus using DMA techniques; interrupts; or other methods. Because only one CPU handles the processing, there is no contention for resources. CPU 302 is also responsible for executing any call establishment protocols. These protocols can include MGCP, H.323, Session Initiation Protocol (SIP), etc. These protocols are used to perform call set up and disconnect.

Figure 4:
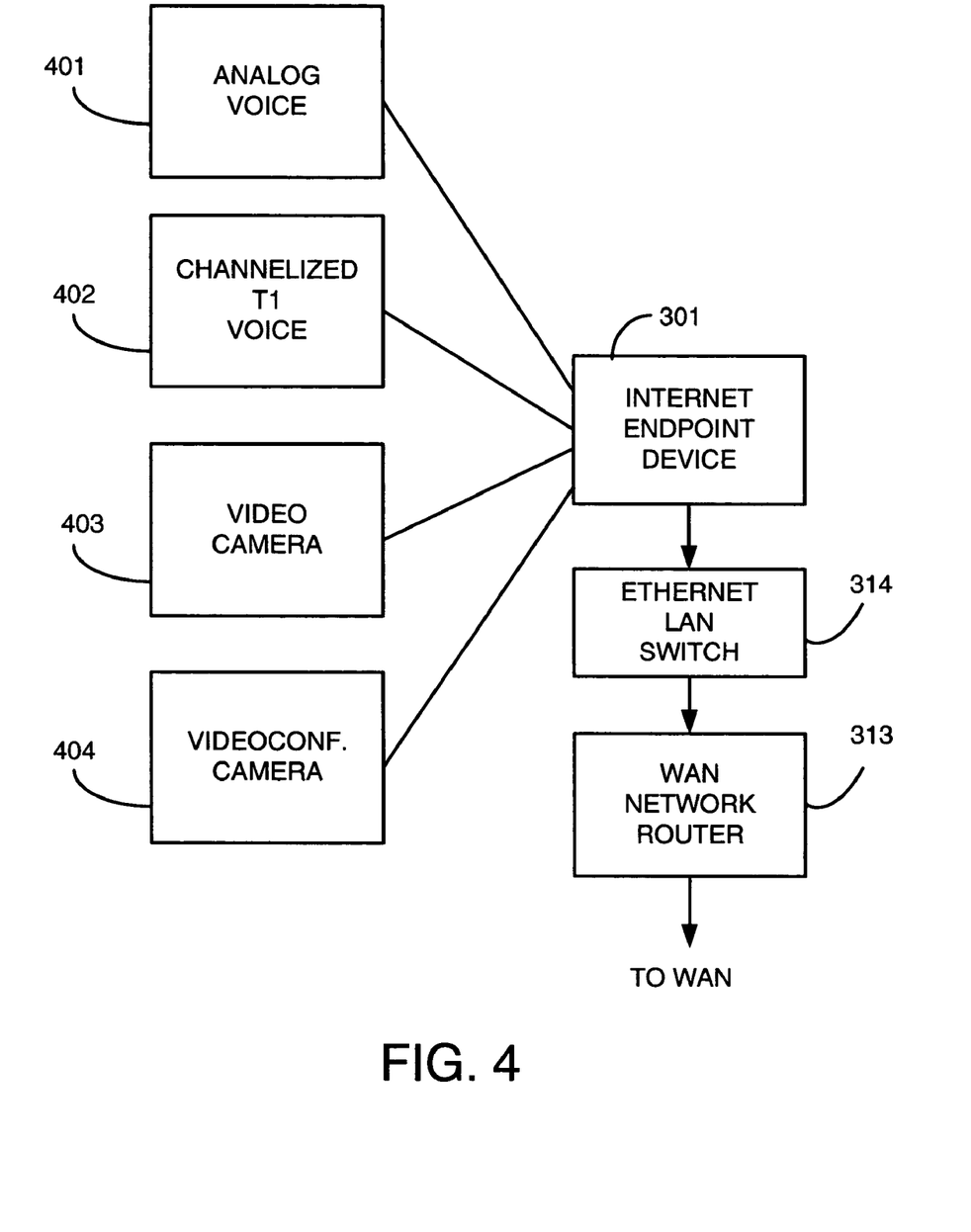
FIG. 4 shows one example of using a device 301 to reduce contention for resources when a plurality of transmitting sources 401 through 404 are transmitting and/or receiving packets.

FIG. 4 shows one example of using a device 301 to reduce contention for resources when a plurality of transmitting sources 401 through 404 are transmitting and/or receiving information. Device 301 is the same device 301 of FIG. 3, and is coupled to a plurality of transmitting sources 401 through 404, such as telephones, and video cameras that transmit video frames. Instead of coupling each transmitting source directly to an Ethernet, which might cause packet loss in an Ethernet LAN switch, each device is coupled to device 301, which reduces congestion by placing packets from each module on the Ethernet using a single CPU and data bus. Realtime data or near-realtime data can thus be handled without losing packets due to LAN contention. As connections are established with devices across the WAN, data flows through the device 301 to and from the devices 401 to 404.

Figure 5:
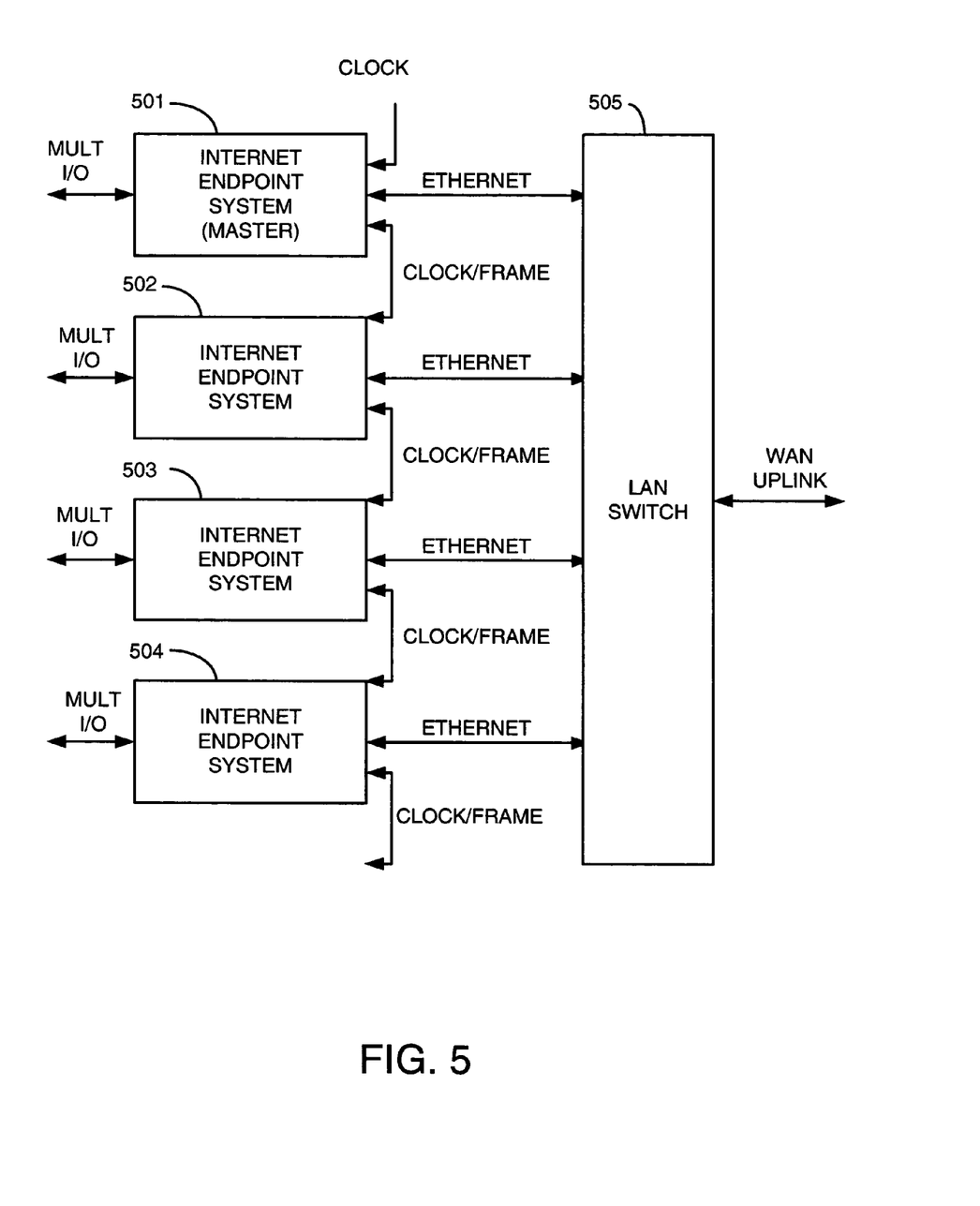
FIG. 5 shows a system employing multiple devices coupled together and synchronized to avoid overloading a LAN switch.

FIG. 5 shows a system employing multiple devices coupled together. When the number of realtime I/O interfaces exceeds what an individual endpoint system 501 can support, then multiple endpoint systems 502-504 can be connected so that they work cooperatively. They can be synchronized to avoid creating congestion or packet loss in a LAN switch. As shown in FIG. 5, each device 501 through 504 corresponds to device 301 of FIG. 3. Each device includes a clock/frame interface corresponding to timing circuit 303 of FIG. 3. One of the devices 501 is designated as the master, and the others are designated as slaves. As with the devices in FIG. 3, each device 501 through 504 accepts inputs from and generates outputs to multiple devices of various types. Each device generates an output to (and receives input via) an Ethernet link to LAN switch 505, which in turn is linked to a WAN router. In order to avoid congestion in LAN switch 505, each device 501 through 504 coordinates its schedule such that packets are not transmitted at the same time to LAN switch 505. Any of various methods can be used to accomplish this, such as assigning time slots for each device to transmit to LAN switch 505 and using the clock/frame interfaces to coordinate this timing.

Figure 6:
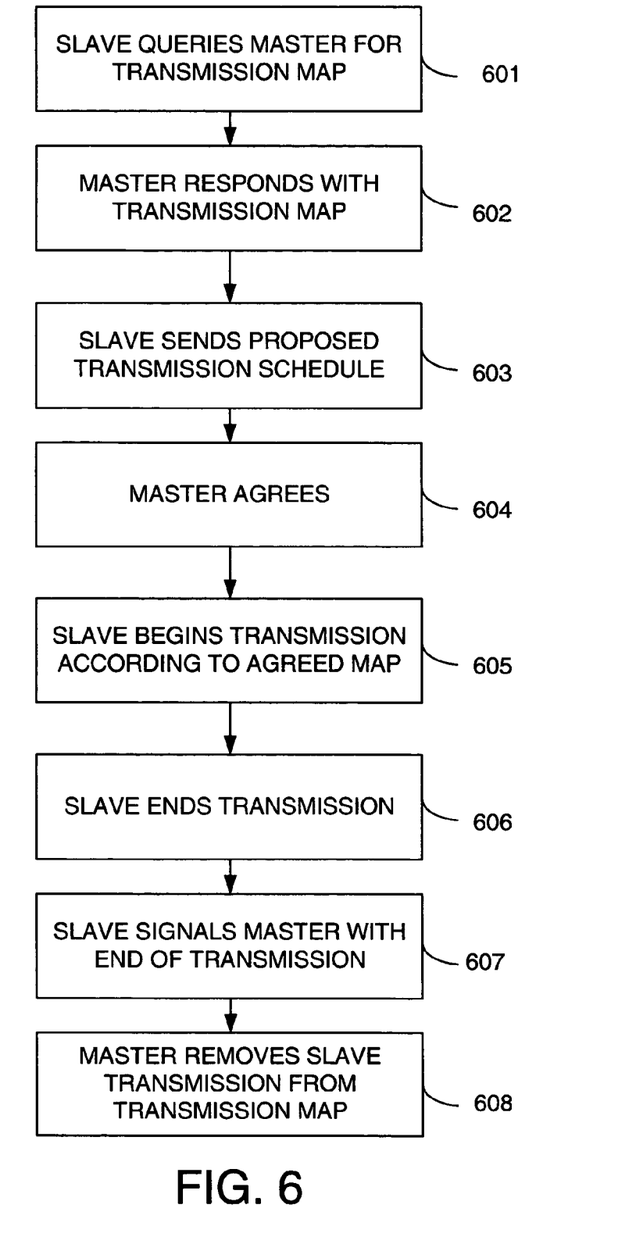
FIG. 6 shows one method for coordinating the transmission of data from the devices shown in FIG. 5.

FIG. 6 shows one method of coordinating a timing schedule among multiple devices to avoid congestion in LAN switch 505. Beginning in step 601, when one of the slave devices in FIG. 5 intends to send data going to or from the I/O devices that it serves, it queries the master device 501 for a transmission map indicating time slots during which the master and/or other slaves have already allocated packet transmissions. A delivery schedule comprising an arbitrary time period (e.g., one second) can be decomposed into frames, subframes and so forth, and each device can determine based on the bandwidth required to support a particular connection how many time slots are needed to transmit data to and from LAN switch 505. (Further details of one possible scheme are described in my previously filed application Ser. No. 10/697, 103, now U.S. Pat. No. 7,339,923, entitled "Endpoint Packet Scheduling System," filed on Oct. 31, 2003, which is incorporated by reference herein.)

Figure 7:
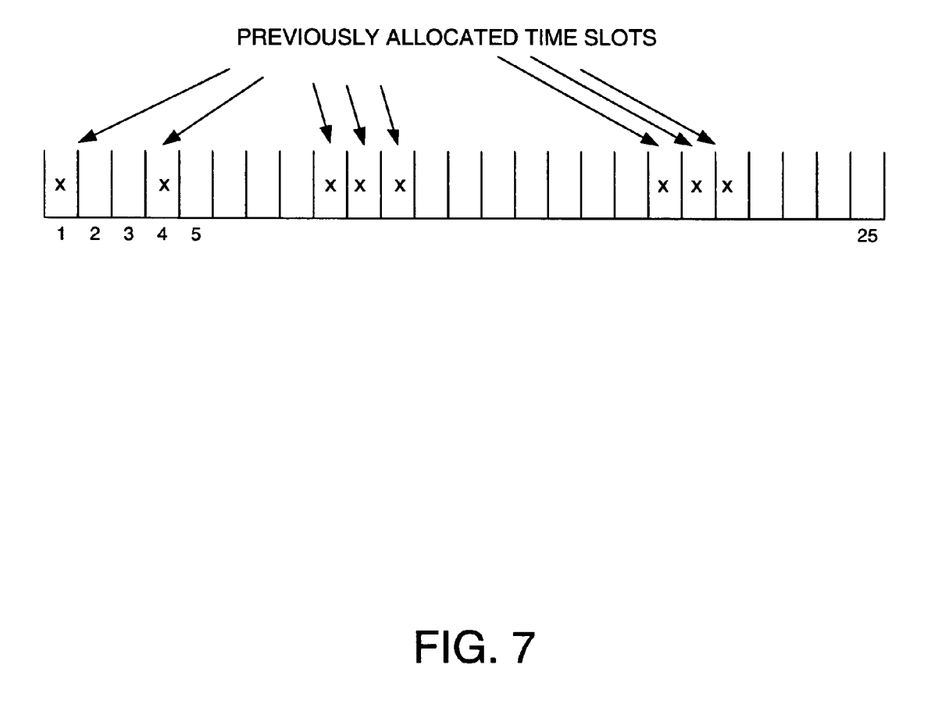
FIG. 7 shows one possible transmission map for use in the method of FIG. 6.

The master device responds in step 602 with a transmission map showing what time slots are available for transmission to LAN switch 505 or, alternatively, what time slots have already been allocated. In step 603, the slave sends a proposed transmission schedule indicating what time slots it proposes to use in order to carry data sufficient to support the various devices it is serving. In step 604, the master device agrees to the proposed schedule or proposes an alternate schedule. FIG. 7 shows one possible implementation of a transmission map, which is essentially a bitmap with each bit corresponding to a time slot.

In step 605, the slave device uses the assigned time slots to schedule packets for transmission over the Ethernet to and from LAN switch 505. In step 606, the slave ends transmission when the connection is no longer needed. In step 607, the slave signals the master to indicate that no further transmission will be required. In step 608, the master removes the slave from the transmission map, freeing up the time slots for other slaves.

As an alternative to a proposed transmission map, each slave device could request a bandwidth and receive from the master a proposed schedule taking into account the proposed bandwidth. When a slave device receives a request from a distant device to initiate a communications flow, the slave device will begin the process illustrated in FIG. 6 to establish the flow of packets to the distant device. Likewise, the distant device will do the same, at its end, to establish a flow of packets towards the local slave device.

Suppose that a virtual connection is to be established between two nodes on the network to support a telephone voice connection. A voice-over-IP connection may require a 64 kilobits per second transfer rate. This rate could be accomplished by transmitting one 80-byte payload packet every 10 milliseconds. In a like manner, a video stream could also be established. A video stream would typically impose higher bandwidth requirements on the network. For instance, an MPEG-2 encoded video flow could typically require 8 megabytes per second transfer rate. This could be accomplished on an Ethernet LAN, each packet could comprise up to 1,500 bytes of payload. The video could be transmitted using approximately 13 packets, sent every 10 milliseconds.

Each device repeatedly transmits to the intended recipient according to the agreed delivery schedule. To support a voice-over-IP connection, for example, the transmitter could transmit an 80-byte packet every 10 milliseconds. It could also transmit a 160 byte packet, at 20 millisecond intervals. For a streaming video connection, more packets are required. In this case the transmitter would transmit larger packets, and groups of them, at a more frequent rate.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer, and such computer-readable media is included within the scope of the intended invention. The invention extends to not only the method but also to computer nodes programmed to carry out the inventive principles. Numbering associated with process steps in the claims is for convenience only and should not be read to imply any particular ordering or sequence.

I claim:

1. A method of eliminating packet loss at a packet-switching device, comprising the steps of:
   (1) collecting in a first device a plurality of different data signals;
   (2) converting each of the plurality of different data signals into digital form;
   (3) transmitting the data signals in digital form from step (2) over a bus or internal network to a CPU of the first device;
   (4) in the CPU of the first device, converting the digital data into network packets destined for delivery to the packet-switching device; and
   (5) in the CPU of the first device, scheduling the transmission of the network packets to the packet-switching device in such a way as to eliminate packet loss in the packet-switching device that would otherwise occur if the network packets had been processed by separate devices coupled to the packet-switching device, wherein packet loss is eliminated without the need for retransmission to the packet-switching device by coordinating the transmission from the first device to avoid contention among transmitters for the packet-switching device, in such a way as to eliminate queue overflow in the packet-switching device, the scheduling step comprising:
      detecting the presence of one or more other devices connected to the first device;
      identifying a designated master device within the one or more other devices connected to the first device; and
      receiving from the designated master device a transmission schedule indicating times during which transmission to the packet-switching device would not conflict with transmissions of any of the one or more other devices connected to the first device.

2. The method of claim 1, wherein the scheduling step further comprises:
   from the first device, transmitting a proposed delivery schedule to the designated master device, wherein the proposed delivery schedule indicates time slots corresponding to times during which the first device proposes to transmit packets to the packet-switching device;
   receiving from the designated master device an indication as to whether the proposed delivery schedule conflicts with any of the one or more other devices connected to the first device; and
   if the proposed delivery schedule does not conflict with any of the one or more other devices connected to the first device, transmitting packets to the packet-switching device according to the proposed delivery schedule.

3. The method of claim 1, wherein the scheduling step further comprises:
   from the first device, transmitting a query to the designated master device;
   receiving from the designated master device a transmission map indicating time slots during which transmission to the packet-switching device would not conflict with any of the one or more other devices connected to the first device;

from the first device, transmitting a proposed transmission map indicating time slots, compatible with the transmission map, during which the first device intends to transmit packets; and from the first device, transmitting packets to the packet-switching device according to the proposed transmission map.

4. The method of claim 1, wherein the scheduling step further comprises:

from the first device, transmitting a bandwidth requirement to the designated master device;

receiving from the designated master device a transmission map indicating time slots during which transmission to the packet-switching device would not conflict with any of the one or more other devices connected to the first device; and from the first device, transmitting packets to the packet-switching device according to the transmission map.

5. The method of claim 1, wherein the scheduling step further comprises:

from the first device, transmitting a query to the designated master device for a LAN-wide transmission map;

receiving from the designated master device a LAN-wide transmission map indicating time slots during which transmission to an packet-switching device would not conflict with any of the one or more other devices connected to the first device;

transmitting to the designated master device a proposed transmission map compatible with the LAN-wide transmission map, said proposed transmission map indicating time slots during which the first device intends to transmit packets to the packet-switching device; and from the first device, transmitting packets to the packet-switching device according to the proposed transmission map.

6. The method of claim 1, wherein the packet-switching device is an Ethernet LAN switch.

7. The method of claim 6, wherein the Ethernet LAN switch is coupled to a Wide Area Network (WAN) router.

8. The method of claim 1, wherein the plurality of different data signals originate from a plurality of local transmitters connected to the first device.

9. An apparatus configured to eliminate packet loss at a packet-switching device, the apparatus comprising:

a CPU;

a bus or internal network;

an internal timing system capable of synchronizing with one or more external time sources;

a plurality of modules coupled to the bus or internal network, where each module is configured to receive data of a different type and present the received data to the CPU over the bus or internal network; and a packet network interface connectable to a packet-switching device, wherein the apparatus is configured to perform the steps of:
(1) collecting a plurality of different data signals from the plurality of modules;
(2) converting each of the plurality of different data signals into digital form;
(3) transmitting the data signals in digital form from step (2) over the bus or internal network to the CPU;
(4) in the CPU, converting the digital data into network packets destined for delivery to the packet-switching device; and
(5) in the CPU, scheduling transmission of the network packets to the packet-switching device in such a way as to eliminate packet loss in the packet-switching device that would otherwise occur if the network packets had been processed by separate devices coupled to the packet-switching device, wherein packet loss is eliminated without the need for retransmission to the packet-switching device by coordinating the transmission of network packets to avoid contention among transmitters for the packet-switching device, in such a way as to eliminate queue overflow in the packet-switching device, the scheduling step comprising:

detecting the presence of one or more other devices connected to the apparatus;

identifying a designated master device within the one or more other devices connected to the apparatus; and receiving from the designated master device a transmission schedule indicating times during which transmission to the packet-switching device would not conflict with transmissions of any of the one or more other devices connected to the apparatus.

10. The apparatus of claim 9, wherein the scheduling step further comprises:

transmitting a proposed delivery schedule to the designated master device, wherein the proposed delivery schedule indicates proposed time slots for transmission of packets from the apparatus to the packet-switching device;

receiving from the designated master device an indication as to whether the proposed delivery schedule conflicts with any of the one or more other devices connected to the apparatus; and if the proposed delivery schedule does not conflict with any of the one or more other devices connected to the apparatus, transmitting packets to the packet-switching device according to the proposed delivery schedule.

11. The apparatus of claim 9, wherein the scheduling step comprises:

transmitting a query to the designated master device;

receiving from the designated master device a transmission map indicating time slots during which transmission to the packet-switching device would not conflict with any of the one or more other devices connected to the apparatus;

transmitting a proposed transmission map to the designated master device indicating time slots, compatible with the transmission map, for transmission of packets to the packet-switching device; and transmitting packets to the packet-switching device according to the proposed transmission map.

12. The apparatus of claim 9, wherein the scheduling step comprises:

transmitting a bandwidth requirement to the designated master device;

receiving from the designated master device a transmission map indicating time slots during which transmission to the packet-switching device would not conflict any of the one or more other devices connected to the apparatus; and transmitting packets to the packet-switching device according to the transmission map.

13. The apparatus of claim 9, wherein the scheduling step comprises:

transmitting a query to the designated master device for a LAN-wide transmission map;

receiving from the designated master device a LAN-wide transmission map indicating time slots during which transmission to the packet-switching device would not conflict with any of the one or more other devices connected to the apparatus;

transmitting to the designated master device a proposed transmission map compatible with the LAN-wide transmission map, said proposed transmission map indicating time slots during which the apparatus intends to transmit packets to the packet-switching device; and transmitting packets to the packet-switching device according to the proposed transmission map.

14. The apparatus of claim 9, wherein the packet-switching device is an Ethernet LAN switch.

15. The apparatus of claim 14, wherein the Ethernet LAN switch is coupled to a Wide Area Network (WAN) router.

16. The apparatus of claim 9, wherein the plurality of modules comprises a plurality of local transmitters connected to the apparatus.

17. A system to eliminate packet loss at a packet-switching device, the system comprising a plurality of devices, each said device comprising:
   a CPU;
   a bus or internal network;
   an internal timing system capable of synchronizing with one or more external time sources;
   one or more modules coupled to the bus or internal network, where each module is configured to receive data and present the received data to the CPU over the bus or internal network; and
   a packet network interface connectable to a packet-switching device,
   wherein each said device is configured to perform the steps of:
      (1) collecting a plurality of different data signals from the one or more modules;
      (2) converting each of the plurality of different data signals into digital form;
      (3) transmitting the data signals in digital form from step (2) over the bus or internal network to the CPU;
      (4) in the CPU, converting the digital data into network packets destined for delivery to the packet-switching device; and
      (5) in the CPU, scheduling transmission of the network packets to the packet-switching device in such a way as to eliminate packet loss in the packet-switching device that would otherwise occur if the network packets had been processed by separate devices coupled to the packet-switching device, the scheduling step comprising:
         detecting the presence of one or more other devices in the system;
         identifying a designated master device within the one or more other devices in the system; and
         receiving from the designated master device a transmission schedule indicating times during which transmission to the packet-switching device would not conflict with transmissions of any of the one or more other devices in the system, and
   wherein each said device is configured to connect to the same packet-switching device, and
   wherein each said device is configured to coordinate with the other devices the scheduling of network packets to the packet-switching device so as to eliminate packet loss at the packet-switching device without the need for retransmission to the packet-switching device by avoiding contention among the devices for the packet-switching device, in such a way as to eliminate queue overflow in the packet-switching device.

18. The system of claim 17, wherein at least one of the plurality of devices in the system is configure to schedule packet delivery over a LAN by agreeing upon time slots during which network packets will be transmitted to the packet-switching device.

19. The system of claim 17, wherein the scheduling step further comprises:
   transmitting a proposed delivery schedule to the designated master device, wherein the proposed delivery schedule indicates proposed time slots for transmission of packets to the packet-switching device;
   receiving from the designated master device an indication as to whether the proposed delivery schedule conflicts with any of the other devices in the system; and
   if the proposed delivery schedule does not conflict with any of the other devices in the system, transmitting packets to the packet-switching device according to the proposed delivery schedule.

20. The system of claim 17, wherein the scheduling step further comprises:
   transmitting a query to the designated master device;
   receiving from the designated master device a transmission map indicating time slots during which transmission to the packet-switching device would not conflict with any of the other devices in the system;
   transmitting to the designated master device a proposed transmission map indicating time slots, compatible with the transmission map, for transmission of packets to the packet-switching device; and
   transmitting packets to the packet-switching device according to the proposed transmission map.

21. The system of claim 17, wherein the scheduling step further comprises:
   transmitting a bandwidth requirement to the designated master device;
   receiving from the designated master device a transmission map indicating time slots during which transmission to the packet-switching device would not conflict with any of the other devices in the system; and
   transmitting packets to the packet-switching device according to the transmission map.

22. The system of claim 17, wherein the scheduling step further comprises:
   transmitting a query to the designated master device for a LAN-wide transmission map;
   receiving from the designated master device a LAN-wide transmission map indicating time slots during which transmission to the packet-switching device would not conflict with any of the other devices in the system;
   transmitting to the designated master device a proposed transmission map compatible with the LAN-wide transmission map, said proposed transmission map indicating time slots during which said device intends to transmit packets to the packet-switching device; and
   transmitting packets to the packet-switching device according to the proposed transmission map.

23. The system of claim 17, wherein the packet-switching device is an Ethernet LAN switch.

24. The system of claim 23, wherein the Ethernet LAN switch is coupled to a Wide Area Network (WAN) router.

25. The system of claim 17, wherein the plurality of devices are configured to be synchronized via the internal timing systems of the devices such that only one of the devices at a time transmits packets to the packet-switching device.

26. The apparatus of claim 9, wherein converting the digital data into network packets comprises generating Internet Protocol (IP) or Ethernet packets destined for delivery to the packet-switching device.

27. The apparatus of claim 10, wherein the proposed delivery schedule is determined between the apparatus and the designated master device, without schedule coordination among intermediate network resources.

28. The apparatus of claim 9, wherein each of the plurality of modules is configured to derive its own timing clock individually by referencing the internal timing system via the bus or internal network.

29. The apparatus of claim 9, wherein scheduling transmission of the network packets comprises configuring the internal timing system to provide software interrupts to the CPU at predetermined time intervals to initiate transmission of said network packets.

30. A system to eliminate packet loss and queue overflow at an Ethernet LAN switch, the system comprising:
- a plurality of devices, wherein each device is configured to connect to a single Ethernet LAN switch coupled to a Wide Area Network (WAN) router, and wherein each device is configured to connect to one or more other devices in the plurality of devices, each said device comprising:
    - a CPU configured to control at least some of the operations of the device;
    - a bus or internal network;
    - one or more modules coupled to the bus or internal network, where each module is configured to receive data and present the received data to the CPU over the bus or internal network; and
    - an internal timing system capable of synchronizing with one or more other timing systems of the other devices in the plurality of devices; and
    - a packet network interface connectable to the Ethernet LAN switch,
    - wherein each said device is further configured to perform the steps of:
        (1) collecting a plurality of different data signals from the one or more modules coupled to the bus or internal network, wherein at least one of the data signals comprises an analog voice data signal and at least one of the data signals comprises an analog video data signal;
        (2) converting each of the plurality of different data signals into digital form, wherein the converting comprises converting the analog voice data signal to a digital voice data signal, converting the analog video data signal to a digital video data signal, and compressing the digital video data signal;
        (3) transmitting the data signals in digital form over the bus or internal network to the CPU;
        (4) in the CPU, converting the digital data into Ethernet packet frames for delivery to the Ethernet LAN switch;
        (5) detecting the presence of one or more of the other devices in the plurality of devices connected to the device;
        (6) identifying a designated master device within the plurality of devices;
        (7) transmitting a query to the designated master device for a transmission map;
        (8) receiving from the designated master device a system-wide transmission map indicating time slots during which transmission to an intended receiving node would not conflict with transmissions of any of the other devices in the plurality of devices, wherein the system-wide transmission map comprises a bitmap with each bit corresponding to a different time slot;
        (9) determining a number of required time slots within the system-wide transmission map that are required to transmit the Ethernet packet frames to the intended receiving node;
        (10) transmitting to the designated master device a proposed transmission map compatible with the system-wide transmission map, said proposed transmission map indicating time slots during which the device intends to transmit the Ethernet packet frames to the intended receiving node, wherein the proposed transmission map is a bitmap with each bit corresponding to a different time slot;
        (11) configuring the internal timing system of the device to provide software interrupts to the CPU at time intervals based on the proposed transmission map to initiate transmission of said Ethernet packet frames;
        (12) transmitting the Ethernet packet frames from the device to the intended receiving node via the Ethernet LAN switch and the Wide Area Network (WAN) router according to the proposed transmission map; and
        (13) after transmitting the Ethernet packet frames to the intended receiving node, signaling the designated master device to indicate that no further transmission is required.

* * * * *